US012717319B2

(12) United States Patent
Park

(10) Patent No.: US 12,717,319 B2
(45) Date of Patent: Aug. 25, 2026

(54) INTELLIGENT BUILDING AUTOMATIC CONTROL SYSTEM WITH FAULT PREDICTION

(71) Applicant: Juin Information System Co., Ltd., Seoul (KR)

(72) Inventor: Jin Lyul Park, Ansan-si (KR)

(73) Assignee: Juin Information System Co., Ltd., Seoul (KR)

(*) Notice: Subject to any disclaimer, the term of this patent is extended or adjusted under 35 U.S.C. 154(b) by 0 days.

(21) Appl. No.: 19/256,487

(22) Filed: Jul. 1, 2025

(65) Prior Publication Data

US 2026/0010154 A1 Jan. 8, 2026

(30) Foreign Application Priority Data

Jul. 2, 2024 (KR) ........................ 10-2024-0086909

(51) Int. Cl.
*G05B 23/02* (2006.01)
*G05B 15/02* (2006.01)

(52) U.S. Cl.
CPC ......... *G05B 23/0254* (2013.01); *G05B 15/02* (2013.01); *G05B 23/0216* (2013.01); *G05B 23/024* (2013.01)

(58) Field of Classification Search
CPC ............... G05B 23/0254; G05B 15/02; G05B 23/0216; G05B 23/024
See application file for complete search history.

(56) References Cited

U.S. PATENT DOCUMENTS

| | | | | |
|---|---|---|---|---|
| 10,156,834 | B2 * | 12/2018 | Lyu | G05B 13/048 |
| 11,131,989 | B2 * | 9/2021 | Cella | G05B 19/0425 |
| 2015/0134123 | A1 * | 5/2015 | Obinelo | F24F 11/30 700/277 |
| 2019/0041836 | A1 | 2/2019 | Cella et al. | |
| 2019/0324433 | A1 | 10/2019 | Cella et al. | |
| 2020/0096990 | A1 | 3/2020 | Cella et al. | |
| 2020/0240875 | A1 * | 7/2020 | Venkateswaran | G01M 99/005 |
| 2021/0019651 | A1 * | 1/2021 | Sugimoto | G06N 3/0442 |

OTHER PUBLICATIONS

“Request for the Submission of an Opinion” Office Action issued in KR 10-2024-0086909; mailed by the Korean Intellectual Property Office on Sep. 9, 2024.

“Written Decision on Registration” Office Action issued in KR 10-2024-0086909; mailed by the Korean Intellectual Property Office on Jan. 21, 2025.

* cited by examiner

*Primary Examiner* — John A Tweel, Jr.
(74) *Attorney, Agent, or Firm* — Studebaker Brackett PLLC

(57) ABSTRACT

The present invention provides a building automatic control system capable of efficiently predicting failures of equipment installed inside a building using a limited-capacity computer system embedded within the building automatic control system.

10 Claims, 4 Drawing Sheets

INTELLIGENT BUILDING AUTOMATIC CONTROL SYSTEM WITH FAULT PREDICTION

CROSS-REFERENCE TO RELATED APPLICATIONS

This application claims the priority of Korean Patent Application No. 10-2024-0086909 filed on Jul. 2, 2024, in the Korean Intellectual Property Office, the disclosure of which is incorporated herein by reference.

BACKGROUND OF THE INVENTION

Field of the Invention

The present invention relates to a building automatic control system, and more specifically, to a building automatic control system capable of predicting and detecting failures of devices or facilities connected to the system and notifying such failures.

Description of the Related Art

Automatic control systems are designed to monitor the status of numerous facilities installed in sites such as buildings, factories, water treatment plants, and sewage treatment plants. By controlling these facilities, the systems aim to achieve efficient management and save energy.

For efficient management, each facility connected to the automatic control system must operate in optimal condition. However, as most facilities are used over time, factors such as frame distortion and rotor eccentricity lead to increased friction. As the frame distortion and rotor eccentricity worsen, minor failures occur, resulting in reduced mechanical efficiency. If these minor failures are not detected and continue, they can escalate into major failures that cause the facility to stop operating entirely, potentially leading to a state where the building or factory cannot be operated at all.

To address these issues, it is essential not only to manage the operation of facilities under normal conditions but also to monitor the condition of the facilities to predict failures and carry out repairs before major failures actually occur.

Accordingly, technologies for predicting failures of facilities connected to automatic control systems have been developed. Recently, failure prediction technologies collect various condition information such as vibration, temperature, and noise from facilities during failure states. These data are then used to train and store models using artificial intelligence, which are compared with operational condition information to predict potential failures.

However, in practice, facility failures do not occur frequently, resulting in an absolute shortage of data such as vibration, temperature, and noise during failure states that can be used for training artificial intelligence. Consequently, it is difficult to learn which conditions indicate a failure prognosis of the facility. As a result, there is a structural limitation in accurately diagnosing the facility's condition, predicting failures in advance, and taking appropriate measures before failures occur.

To solve this problem, the present applicant previously registered Korean Patent No. 10-2174722. In that invention, when installing mechanical devices such as motors or pumps at a site, the shortage of noise data collected from the on-site motors or pumps was addressed by applying different processing and learning methods to noise data collected during a trial operation period (t0) and a normal operation period (t1) after installation. This approach aimed to secure big data and use it to predict failures of on-site mechanical devices such as motors and pumps.

However, this method also has limitations: since there is a wide variety of equipment types and failure modes are complex, and because failures do not occur frequently, it remains insufficient for accurately predicting failures.

In addition, conventional failure diagnosis using artificial intelligence requires collecting operational data over a certain period to build a large dataset through learning, and then applying AI techniques to determine failures based on this data. Consequently, the amount of data becomes significantly large.

For example, when using deep learning algorithms for image recognition, millions of images must be processed. This requires handling a large volume of data, which demands high-capacity storage devices and fast processing speeds. As a result, the processing capacity increases, leading to higher costs for the building automatic control system compared to the equipment itself. Therefore, it is difficult to adopt such approaches using the limited-capacity systems typically embedded within building automatic control systems.

Accordingly, there has been a need to develop building automatic control system technology capable of efficiently predicting failures of various devices using the limited-capacity systems embedded within building automatic control systems.

SUMMARY OF THE INVENTION

The objective of the present invention, which aims to solve the above problems, is to provide an intelligent building automatic control system capable of automatically predicting potential failures and identifying failure locations in advance based on the operational efficiency of facilities used in buildings and similar structures.

Another objective of the present invention is to provide a building automatic control system capable of efficiently predicting failures of equipment installed inside a building using a limited-capacity computer system embedded within the building automatic control system.

Another objective of the present invention is to provide an intelligent building automatic control system capable of accurately predicting failures by enhancing its self-learning failure prediction function through the use of artificial intelligence algorithms with low data processing requirements.

Another objective of the present invention is to provide an intelligent building automatic control system that contributes to energy savings by ensuring efficient operation of facilities through early detection and repair of minor failures.

The objectives of the present invention are not limited to those mentioned above, and other objectives not explicitly stated will be clearly understood by those skilled in the art from the following description.

To achieve the above objectives, the present invention provides an intelligent building automatic control system that predicts failures of facilities used in buildings based on their operational state.

The building automatic control system includes a central control unit, which is connected via a communication network to facility controllers that display the current and voltage supplied to the facilities and monitor their operational states, as well as multiple sensors that detect the operational states of each facility.

The sensors include a static pressure sensor that measures the static pressure of a fluid and a dynamic pressure sensor that measures the velocity head of a fluid.

The central control unit calculates an operational state coefficient, which is the ratio of the energy supplied to the facility to the operational energy of the facility.

When the operational state coefficient is equal to or less than a reference operational state coefficient, the system predicts that the corresponding facility will fail, generates a failure prediction message, and notifies the user.

Meanwhile, it is preferable that the operational state coefficient is calculated based on the integrated value of the electric power obtained by integrating the current and voltage supplied to the facility, and the integrated value of the changes in static pressure and velocity head of the fluid.

In addition, it is preferable that the operational state coefficient is calculated according to the following [Equation 1].

$$K_n = C\left(A_0\int_t^{t+\Delta t} P_{so}H_{fo}dt - A_i\int_t^{t+\Delta t} P_{si}H_{fi}dt\right) \Big/ \int_t^{t+\Delta t} EIdt \quad \text{[Equation 1]}$$

Here, $K_n$ refers to the operational state coefficient of the n-th facility (300);

C is the energy conversion coefficient;

$A_c$ is the discharge area;

A is the suction area;

$P_{so}$ represents the static pressure of the discharge fluid, expressed in $kg/m^2$;

$H_{fo}$ represents the velocity head of the discharge fluid, expressed in meters (m);

$P_{si}$ represents the static pressure of the suction fluid, expressed in $kg/m^2$;

$H_{fi}$ represents the velocity head of the suction fluid, expressed in meters (m);

E is the voltage for operating the motor;

I is the current for operating the motor; and t represents time.

Meanwhile, when the pressure sensors are replaced with differential pressure sensors configured to measure the difference in static pressure and velocity head between the discharge duct and the suction duct, it is preferable that the operational state coefficient is calculated according to the following [Equation 3].

When the operational state coefficient is equal to or less than a reference operational state coefficient pre-stored in the reference value setting unit, the fan (300) is predicted to be in a failure state, and a failure prediction message is sent.

$$K_n = C(A_0 - A_i)\int_t^{t+\Delta t} \Delta P \cdot \Delta H dt \Big/ \int_t^{t+\Delta t} EIdt \quad \text{[Equation 3]}$$

Here, $K_n$ refers to the operational state coefficient of the n-th facility (300);

C is the energy conversion coefficient;

$A_c$ is the discharge area;

A is the suction area;

ΔP represents the differential static pressure between the discharge fluid and the suction fluid, expressed in $kg/m^2$;

ΔH represents the differential velocity head between the discharge fluid and the suction fluid, expressed in meters (m);

E is the voltage for operating the motor;

I is the current for operating the motor; and t represents time.

The reference operational state coefficient is initially set to 0.8. Subsequently, it is preferable to automatically update and set this value by learning the operational state coefficient at the time an actual failure occurs. However, if no failure cases are observed over a certain period, the coefficient may also be adjusted upward.

The energy conversion coefficient is initially determined under normal operating conditions according to the following [Equation 2] and stored in the correction value memory.

Subsequently, when the equipment is repaired or when the condition of the system including the equipment changes and the energy correction coefficient is updated, it is preferable to store the updated value in the correction value memory.

$$C = \int_t^{t+\Delta t} EIdt \Big/ \left(A_0\int_t^{t+\Delta t} P_{so}H_{fo}dt - A_i\int_t^{t+\Delta t} P_{si}H_{fi}dt\right) \quad \text{[Equation 2]}$$

The central control unit preferably includes an input unit, a control unit that performs calculations on the measured values according to the input commands, a memory unit that stores the measured values and data computed by the control unit, a display unit, and a communication unit.

The control unit preferably comprises a data processing unit, a reference value setting unit, a failure pattern learning unit (113), and a failure prediction unit.

The memory unit preferably includes a measurement value memory, a correction value memory, and a reference value memory that stores the reference values used for failure prediction judgments of each facility.

Upon receiving the failure prediction message, the user preferably conducts a detailed inspection.

If an actual failure is confirmed, the user inputs the failure occurrence time and failure location into the failure pattern learning unit using input/output devices.

The failure pattern learning unit then stores the measurement values at the time of failure and the failure location in the reference value memory.

The failure pattern learning unit preferably uses an artificial intelligence machine learning algorithm aimed at determining the occurrence of failures, based on statistical data stored in the reference value memory—including correction values generated by the data processing unit—and data just before an actual failure.

By using this approach, the unit detects the mapping relationship between characteristic patterns (including energy correction coefficients and failure coefficients) and failures for each facility connected to the building automatic control system.

Furthermore, it is preferable that the failure pattern learning unit learns a failure pattern model from the statistical data and the mapping relationship, and stores the trained failure pattern model in the reference value memory.

When the operational state coefficient falls below the reference value and a failure of the facility is predicted, it is preferable to further include confirming the failure and its location by referring to the sound pattern at the time of prediction and comparing it with the failure operation sound patterns and corresponding failure locations stored in the reference value memory.

Then, a failure confirmation message is sent.

The central control unit preferably stores in the memory the sound data input from the facility at the time of failure and the failure location input by the user.

The failure pattern learning unit then applies the input sound data and user-specified failure location to a machine learning engine to identify characteristics such as waveform shapes and amplitudes, stores this information in the reference value memory, and subsequently uses it as a basis for confirming facility failures and their locations.

The present invention predicts failures using data obtained by integrating operating pressure and input power.

As a result, failures can be predicted without requiring large memory capacity or high-level computations, allowing efficient failure prediction of facilities in advance even with the limited-capacity systems embedded within control systems.

This enables the reduction of economic and reputational losses caused by unexpected failures.

In addition, the present invention utilizes artificial intelligence algorithms with low data processing requirements, enabling the building automatic control system to further develop its self-learning failure prediction function and make accurate judgments.

Furthermore, the present invention fundamentally prevents facilities from operating at low efficiency, thereby enabling a reduction in building energy consumption.

In addition, the present invention applies the sound data input from the facility at the time of failure and the failure location input by the user to a machine learning engine, and utilizes this information as a basis for confirming facility failures and their locations.

As a result, it enables accurate failure prediction and confirmation.

The effects of the present invention are not limited to those mentioned above, and other effects not explicitly stated will be clearly understood by those skilled in the art from the following description.

DETAILED DESCRIPTION OF THE INVENTION

Figure 1:
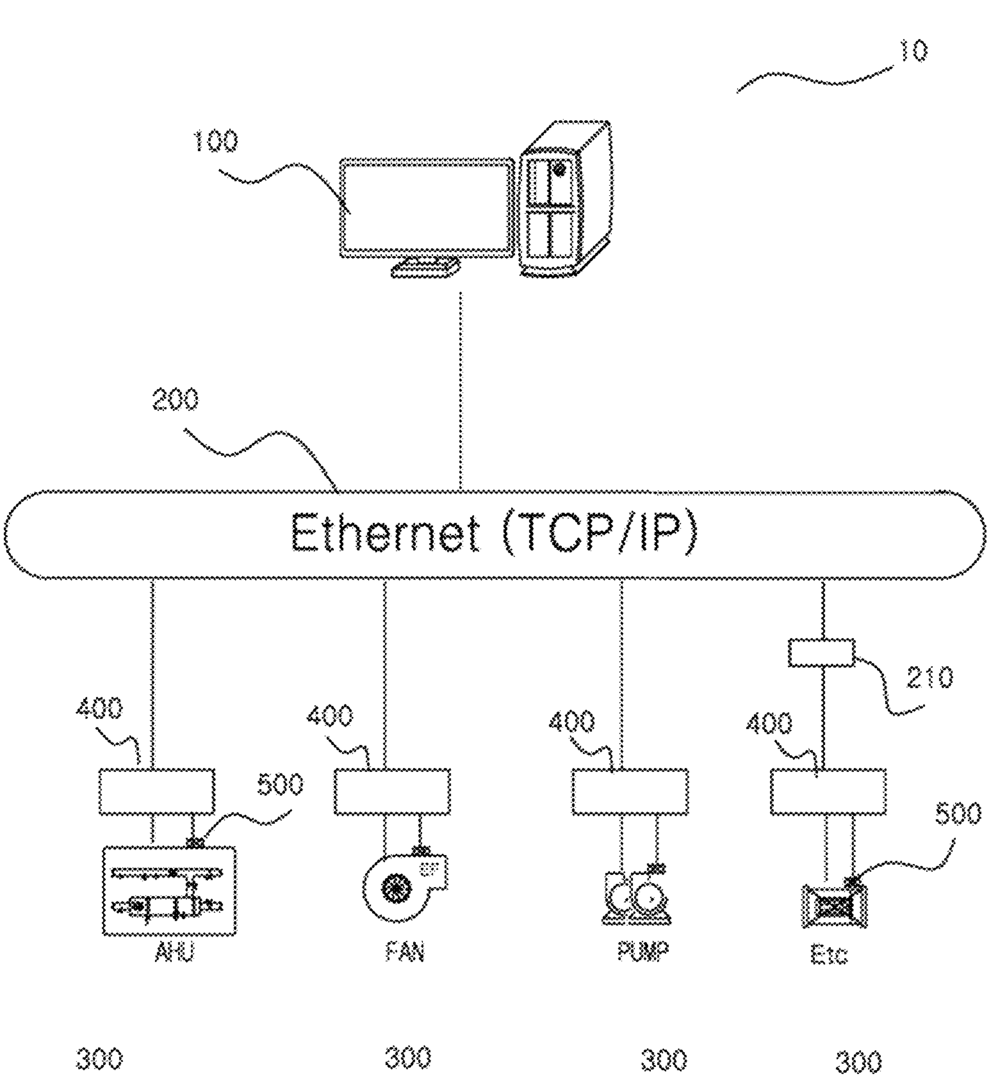
FIG. 1 is a diagram illustrating the configuration of a building automatic control system according to an embodiment of the present invention.

Hereinafter, embodiments of the present invention will be described in detail with reference to the accompanying drawings.

The present invention may be implemented in various different forms and is not limited to the embodiments described herein.

In the drawings, parts not related to the description have been omitted to clearly illustrate the present invention, and throughout the specification, the same reference numerals are used to denote identical or similar components.

In the present invention, the building automatic control system refers to a management system that monitors the status of various facilities such as air handling units, heat exchangers, and pumps installed in sites such as buildings, factories, water treatment plants, and sewage treatment plants, and controls these facilities.

The present invention predicts mechanical failures of on-site facilities using operating pressure, input power, and noise data, and confirms the occurrence and location of the failures.

As shown in FIG. 1, a building automatic control system 10 according to an embodiment of the present invention includes a central control unit 100, one or more facilities 300 connected to the central control unit 100 via a communication network 200 that includes a communication converter device 210, a facility controller 400 and sensors 500 for detecting the status of the facilities.

Here, the facility 300 refers to a target controlled by the central control unit 100 and may include, for example, an air handling unit, fan, pump, temperature/humidity sensor, chiller, lighting equipment, power equipment, fire protection system, or a combination of some of these components.

Figure 2:
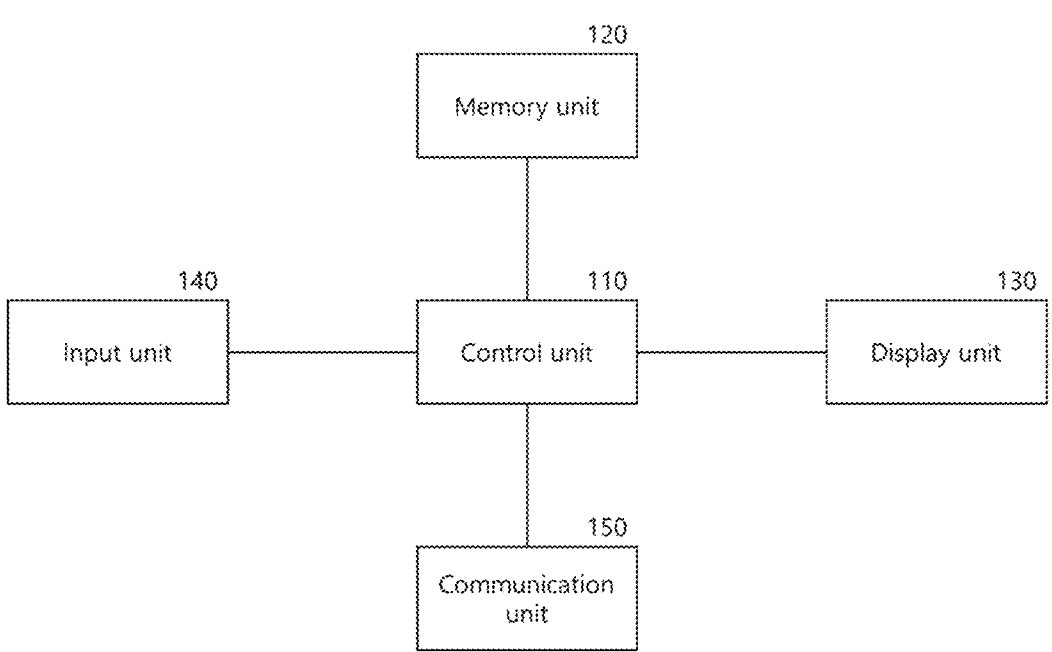
FIG. 2 is a block diagram of the central control unit according to an embodiment of the present invention.
Figure 3:
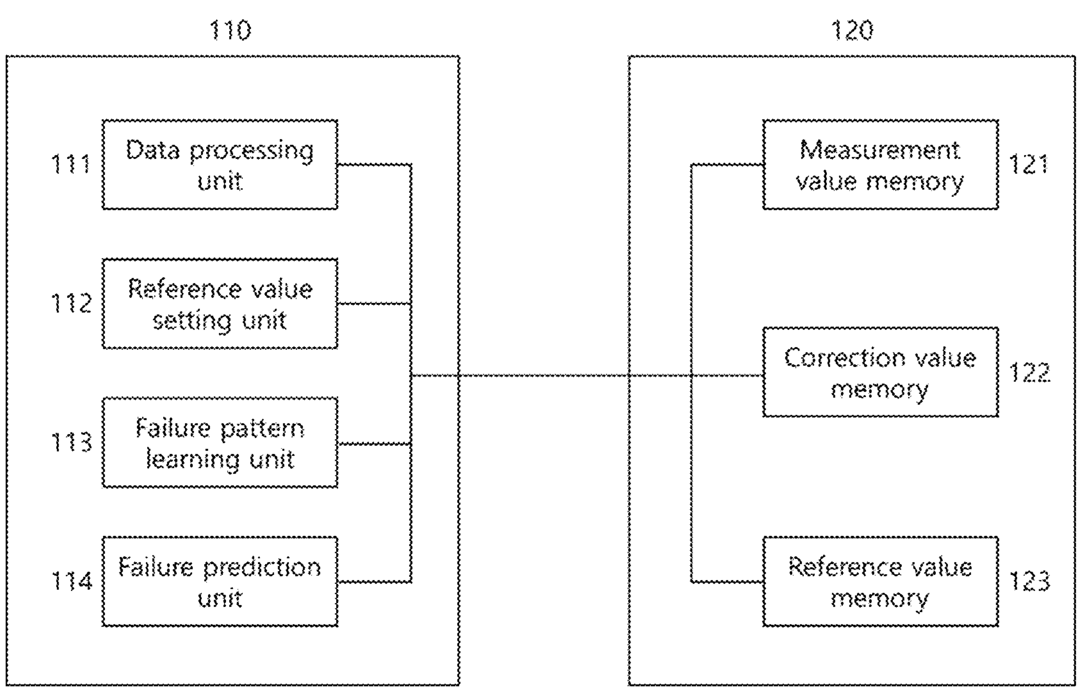
FIG. 3 is a block diagram of the control unit of the intelligent building automatic control system for failure prediction according to an embodiment of the present invention.

As shown in FIG. 2, the central control unit 100 includes an input unit 140 for receiving measurement values from sensors 500 installed on the facility 300 and for receiving commands to control the control unit;

- a control unit 110 that performs calculations on the measurement values according to the input commands;
- a memory unit 120 that stores the measurement values and data computed by the control unit 110;
- a display unit 130; and
- a communication unit 150.

In addition, the control unit 110 includes a data processing unit 111, a reference value setting unit 112, a failure pattern learning unit 113, and a failure prediction unit 114.

In addition, the memory unit 120 includes a measurement value memory 121, a correction value memory 122, and a reference value memory 123 that stores the reference values used for failure prediction judgments of each facility 300.

Information collected from the facility 300, the facility controller 400, and the sensors 500 that detect the status of the facility is transmitted to the central control unit 100 via the communication network 200.

The communication network 200 may include a communication converter device 210 that converts communication signals to unify communication methods, such as protocols used to transmit information detected by the facility 300, the facility controller 400, and the sensors 500.

Hereinafter, the operation of the central control unit 100 for failure prediction according to an embodiment of the present invention will be described, taking as an example the case where the facility 300 connected to the automatic control system 10 configured as described above is a fan.

The central control unit 100 includes a control unit 110 that is communicatively connected to a control device, such as a DDC(Direct Digital Controller), installed in the facility controller 400 of the fan.

The central control unit 100 calculates the operational state coefficient based on the integrated value of the electric power obtained by integrating the current and voltage supplied to the facility, and the integrated value of the changes in static pressure and velocity head of the fluid.

Specifically, it registers one or more pressure sensors for the facility 300, and uses, as one element for failure prediction, the changes in the measurement values of the pressure sensors along with the voltage and current measurements of the power supplied to the equipment, which are obtained from the motor control panel included in the facility controller 400 that supplies electricity.

Figure 4:
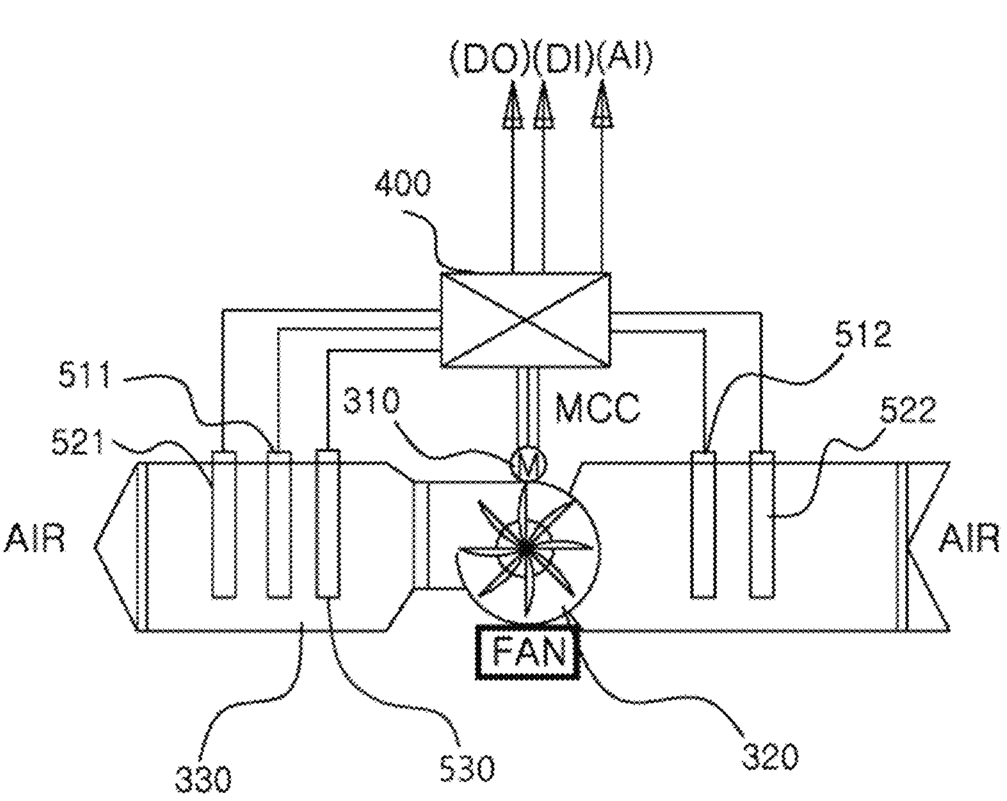
FIG. 4 is a configuration diagram of an embodiment in which the intelligent building automatic control system for failure prediction according to an embodiment of the present invention is applied.

As shown in FIG. 4, the fan 300 as the facility is composed of a motor 310, a casing 320, and a duct 330.

A facility controller 400, which includes a controller such as a DDC that displays the current and voltage supplied to the motor 310 and monitors the operational state of the fan 300, is connected to it.

In the discharge duct connected to the casing of the fan, a static pressure sensor 511 for measuring the static pressure of the discharge fluid (expressed in $kg/m^2$) and a dynamic pressure sensor 521 for measuring the velocity head of the discharge fluid (expressed in meters) are installed.

In the suction duct, a static pressure sensor 512 for measuring the static pressure of the suction fluid (expressed in $kg/m^2$), a dynamic pressure sensor 522 for measuring the velocity head of the suction fluid (expressed in meters), and a sound sensor 530 for collecting sound data are installed.

Meanwhile, these pressure sensors may also be replaced with differential pressure sensors configured to measure the difference in static pressure and the difference in velocity head between the discharge duct and the suction duct.

The static pressure and velocity head of the fluid measured by the pressure sensors, along with the voltage and current values of the input electricity, are transmitted from the DDC included in the facility controller 400 to the control unit of the central control unit 100 via the communication network 200.

In this embodiment, failure prediction is performed by calculating the operational state coefficient using the integrated value of the electric power obtained by integrating the current and voltage supplied from the facility controller 400, and the integrated value of the changes in fluid pressure and velocity head obtained from the pressure sensors, according to [Equation 1].

When the operational state coefficient is equal to or less than the reference operational state coefficient, the fan is predicted to be in a failure state.

Specifically, the control unit stores the transmitted measurement values in the measurement value memory 121, calculates the operational state coefficient according to [Equation 1], and, when the operational state coefficient is equal to or less than the reference operational state coefficient pre-stored in the reference value setting unit, predicts that the fan 300 is in a failure state and sends a failure prediction message.

$$K_n = C\left(A_0\int_t^{t+\Delta t} P_{so}H_{fo}dt - A_i\int_t^{t+\Delta t} P_{si}H_{fi}dt\right)\Big/\int_t^{t+\Delta t} EIdt \quad \text{[Equation 1]}$$

Here, $K_n$ refers to the operational state coefficient of the n-th facility (300);

C is the energy conversion coefficient;

$A_c$ is the discharge area;

A is the suction area;

$P_{so}$ represents the static pressure of the discharge fluid, expressed in $kg/m^2$;

$H_{fo}$ represents the velocity head of the discharge fluid, expressed in meters (m);

$P_{si}$ represents the static pressure of the suction fluid, expressed in $kg/m^2$;

$H_{fi}$ represents the velocity head of the suction fluid, expressed in meters (m);

E is the voltage for operating the motor;

I is the current for operating the motor; and t represents time.

Meanwhile, when the pressure sensors are replaced with differential pressure sensors configured to measure the difference in static pressure and the difference in velocity head between the discharge duct and the suction duct, the operational state coefficient is calculated according to [Equation 3].

When the operational state coefficient is equal to or less than the reference operational state coefficient pre-stored in the reference value setting unit, the fan 300 is predicted to be in a failure state, and a failure prediction message is sent.

$$K_n = C(A_0 - A_i)\int_t^{t+\Delta t} \Delta P\cdot\Delta H dt\Big/\int_t^{t+\Delta t} EIdt \quad \text{[Equation 3]}$$

Here, $K_n$ refers to the operational state coefficient of the n-th facility (300);

C is the energy conversion coefficient;

$A_c$ is the discharge area;

A is the suction area;

ΔP represents the differential static pressure between the discharge fluid and the suction fluid, expressed in $kg/m^2$;

ΔH represents the differential velocity head between the discharge fluid and the suction fluid, expressed in meters (m);

E is the voltage for operating the motor;

I is the current for operating the motor; and t represents time.

In this way, [Equation 1] and [Equation 3] calculate the operational state coefficient based on the ratio of the energy supplied to the facility—obtained by integrating the voltage and current used to operate the facility's motor—to the energy generated in the fluid by the supplied energy.

By comparing this operational state coefficient with the reference operational state coefficient, failures are predicted.

Meanwhile, the reference operational state coefficient is initially set to 0.8, and it is preferable to automatically update and set this value by learning the operational state coefficient at the time an actual failure occurs.

Meanwhile, it is preferable that the calculation interval for performing the computation of [Equation 1] using the received measurement values is set to 10 minutes, and that each unit calculation time is at least 10 seconds so as to enable detection of defects in the motor bearings and fan blades of the fan.

Meanwhile, it is preferable that the operational state coefficient corresponds to the actual mechanical efficiency of the facility, such as a fan. However, due to the unique characteristics of the facility's shape—such as the shapes of the discharge and suction ports—and changes in the internal energy of the fluid caused by frictional heat, it is difficult to achieve a perfect match.

Accordingly, in the present invention, an energy correction coefficient C is used to make the operational state coefficient approximate the efficiency.

Under normal operating conditions, the energy correction coefficient is determined in the reference value setting unit 112 according to [Equation 2] and stored in the correction value memory 122.

When the facility is later repaired or the condition of the system including the facility changes and the energy correction coefficient is updated, the updated value is stored in the correction value memory 122.

$$C = \int_{t}^{t+\Delta t} EIdt \Big/ \left( A_0 \int_{t}^{t+\Delta t} P_{so} H_{fo} dt - A_i \int_{t}^{t+\Delta t} P_{si} H_{fi} dt \right) \quad \text{[Equation 2]}$$

Specifically, when the operational state coefficient falls below the reference value, the failure prediction unit 114 predicts that a failure may occur in the fan 300.

The central control unit 100 then generates a failure prediction message indicating the possibility of a failure in the fan 300 and transmits this message to an administrator's terminal, mobile phone, or similar device via the communication unit 150.

Upon receiving the failure prediction message, the user conducts a detailed inspection.

If an actual failure is confirmed, the user inputs the failure occurrence time and failure location into the failure pattern learning unit using input/output devices.

The failure pattern learning unit then stores the measurement values at the time of failure and the failure location in the reference value memory 123.

In addition, to confirm a failure, sound data input from the fan at the time of setting the energy correction coefficient during normal operation is collected and stored as normal operation sound data in the measurement value memory 121.

When the operational state coefficient calculated using [Equation 1] falls below the reference value and it is determined that the fan is likely to fail, the sound data input from the fan at that time is collected and stored as failure operation sound data in the reference value memory 123.

In addition, the failure pattern learning unit 113 reflects the mapping relationship between the characteristic patterns of the normal operation sound data stored in the measurement value memory 121 and the failure operation sound data stored in the reference value memory 123, and the corresponding failures, into an artificial intelligence algorithm.

The unit then derives the normal operation sound pattern and failure operation sound pattern and stores them in the reference value memory 123.

In addition, after repairing a failure or after expert inspections are conducted periodically to check the condition of each facility 300, when it is determined to be safe, the sound pattern received from the sensors is stored as normal operation sound data in the reference value memory 123.

Meanwhile, when the operational state coefficient falls below the reference value and the fan is predicted to fail, the sound pattern at the prediction time is compared with the failure operation sound patterns and corresponding failure locations stored in the reference value memory 123.

Based on this, the fan's failure and its location are confirmed, and a failure confirmation message is sent.

In addition, the central control unit 100 stores in the memory the sound data input from the fan at the time of failure and the failure location input by the user.

The failure pattern learning unit 113 then applies the input sound data and user-specified failure location to a machine learning engine to identify characteristics such as waveform shapes and amplitudes, stores this information in the reference value memory 123, and subsequently uses it as a basis for confirming the fan's failure and failure location.

By confirming failures using sound data in this way, accurate failure prediction and confirmation can be achieved even if the operational state coefficient changes due to aging of the facility.

The failure pattern learning unit 113 uses an artificial intelligence machine learning algorithm aimed at determining the occurrence of failures, based on statistical data stored in the reference value memory 123—including correction values generated by the data processing unit 111—and data just before an actual failure.

Through this, it detects the mapping relationship between characteristic patterns—including energy correction coefficients and failure coefficients—and failures for each of the various facilities 300 connected to the building automatic control system 10.

The unit then learns a failure pattern model from the statistical data and the mapping relationship.

Additionally, the learned failure pattern model is also stored in the reference value memory 123.

The failure pattern learning unit 113 may use a machine learning algorithm such as an artificial neural network; however, it is not limited to this and may employ various known machine learning algorithms.

In other words, the failure pattern learning unit 113 can learn and detect the mapping relationship between characteristic patterns and failures by using a machine learning algorithm that targets failure determination, utilizing pattern data generated by the data processing unit 111 and data stored in the memory unit 120.

Through this process, it is able to learn a failure pattern model from the statistical data and the mapping relationship.

While the embodiments of the present invention have been described in detail above with reference to the accompanying drawings, the present invention is not limited to these embodiments.

Various modifications and changes may be made without departing from the technical spirit and scope of the present invention.

Accordingly, the embodiments disclosed herein are intended to illustrate the technical spirit of the present invention, not to limit it, and the scope of the technical spirit of the present invention should not be construed as being restricted by these embodiments.

Therefore, the above-described embodiments should be understood as illustrative in all respects and not restrictive.

The scope of protection of the present invention should be interpreted according to the following claims, and all technical ideas within equivalent scopes should be regarded as being included within the scope of rights of the present invention.

DESCRIPTION OF REFERENCE NUMERALS

100: Central control unit
110: Control unit
120: Memory unit
130: Display unit
140: Input unit
150: Communication unit
200: Communication network
210: Communication converter device
300: Facility
400: Facility controller
500: Sensor

What is claimed is:

1. An intelligent building automatic control system for predicting failures of facilities based on the operational state of facilities used in buildings and the like, wherein the building automatic control system includes a central control unit;

the central control unit is connected via a communication network to a facility controller that displays the current and voltage supplied to the facility and monitors its operational state, as well as multiple sensors for detecting the operational state of each facility;

the sensors include a static pressure sensor for measuring the static pressure of a fluid and a dynamic pressure sensor for measuring the velocity head of a fluid;

the central control unit calculates an operational state coefficient, which is the ratio of the energy supplied to the facility to the operational energy of the facility, and when the operational state coefficient is equal to or less than a reference operational state coefficient, it predicts that the facility will fail and generates a failure prediction message to notify the user;

and the operational state coefficient is calculated based on the integrated value of electric power obtained by integrating the current and voltage supplied to the facility and the integrated value of changes in static pressure and velocity head of the fluid.

2. The intelligent building automatic control system for predicting failures according to claim 1, wherein the operational state coefficient is calculated according to [Equation 1]

$$K_n = C\left(A_0\int_t^{t+\Delta t} P_{so}H_{fo}dt - A_i\int_t^{t+\Delta t} P_{si}H_{fi}dt\right)\Big/\int_t^{t+\Delta t} EIdt \quad \text{[Equation 1]}$$

Here, $K_n$ refers to the operational state coefficient of the n-th facility (300);

C is the energy conversion coefficient;

$A_c$ is the discharge area;

A is the suction area;

$P_{so}$ represents the static pressure of the discharge fluid, expressed in $kg/m^2$;

$H_{fo}$ represents the velocity head of the discharge fluid, expressed in meters (m);

$P_{si}$ represents the static pressure of the suction fluid, expressed in $kg/m^2$;

$H_{fi}$ represents the velocity head of the suction fluid, expressed in meters (m);

E is the voltage for operating the motor;

I is the current for operating the motor; and t represents time.

3. The intelligent building automatic control system for predicting failures according to claim 1, wherein the operational state coefficient is calculated according to [Equation 3];

$$K_n = C(A_0 - A_i)\int_t^{t+\Delta t} \Delta P \cdot \Delta H dt\Big/\int_t^{t+\Delta t} EIdt \quad \text{[Equation 3]}$$

Here, $K_n$ refers to the operational state coefficient of the n-th facility (300);

C is the energy conversion coefficient;

$A_c$ is the discharge area;

A is the suction area;

ΔP represents the differential static pressure between the discharge fluid and the suction fluid, expressed in $kg/m^2$;

ΔH represents the differential velocity head between the discharge fluid and the suction fluid, expressed in meters (m);

E is the voltage for operating the motor;

I is the current for operating the motor; and t represents time.

4. The intelligent building automatic control system for predicting failures according to claim 1, wherein the reference operational state coefficient is initially set to 0.8, and is subsequently automatically updated and set by learning the operational state coefficient at the time an actual failure occurs.

5. The intelligent building automatic control system for predicting failures according to claim 2, wherein the energy conversion coefficient is determined under normal operating conditions according to [Equation 2] and stored in a correction value memory, and when the facility is later repaired or the condition of the system including the facility changes and the energy correction coefficient is updated, the updated value is stored in the correction value memory;

$$C = \int_t^{t+\Delta t} EIdt\Big/\left(A_0\int_t^{t+\Delta t} P_{so}H_{fo}dt - A_i\int_t^{t+\Delta t} P_{si}H_{fi}dt\right). \quad \text{[Equation 2]}$$

6. The intelligent building automatic control system for predicting failures according to claim 1, wherein the central control unit includes an input unit, a control unit that performs calculations on the measurement values according to input commands, a memory unit that stores the measurement values and data calculated by the control unit, a display unit, and a communication unit;

the control unit comprises a data processing unit, a reference value setting unit, a failure pattern learning unit, and a failure prediction unit;

and the memory unit includes a measurement value memory, a correction value memory, and a reference value memory that stores reference values used for failure prediction judgments of each facility.

7. The intelligent building automatic control system for predicting failures according to claim 6, wherein upon receiving the failure prediction message, the user conducts a detailed inspection, and if an actual failure is confirmed, the user inputs the failure occurrence time and failure location into the failure pattern learning unit using input/output devices, and the failure pattern learning unit stores the measurement values at the time of failure and the failure location in the reference value memory.

8. The intelligent building automatic control system for predicting failures according to claim 6, wherein the failure pattern learning unit uses an artificial intelligence machine learning algorithm aimed at determining failure occurrence, based on statistical data stored in the reference value memory—including correction values generated by the data processing unit—and data just before an actual failure;

detects the mapping relationship between characteristic patterns—including energy correction coefficients and failure coefficients—and failures for each facility connected to the building automatic control system;

learns a failure pattern model from the statistical data and the mapping relationship; and stores the learned failure pattern model in the reference value memory.

9. The intelligent building automatic control system for predicting failures according to claim 6, wherein when the operational state coefficient falls below the reference value and the facility is predicted to fail, the sound pattern at the prediction time is compared with the failure operation sound patterns and corresponding failure locations stored in the reference value memory, thereby confirming the failure and failure location of the fan, and further sending a failure confirmation message.

10. The intelligent building automatic control system for predicting failures according to claim 9, wherein the central control unit stores in the memory the sound data input from the facility at the time of failure and the failure location input by the user, the failure pattern learning unit applies the input sound data and user-specified failure location to a machine learning engine to identify characteristics such as waveform shapes and amplitudes, stores this information in the reference value memory, and subsequently uses it as a basis for confirming facility failures and failure locations.

* * * * *